(12) United States Patent
McCusker et al.

(10) Patent No.: US 8,977,491 B1
(45) Date of Patent: Mar. 10, 2015

(54) SYSTEM AND METHOD FOR VERIFYING DISPLAYED TERRAIN INFORMATION

(75) Inventors: Patrick D. McCusker, Walker, IA (US); Daniel L. Woodell, Cedar Rapids, IA (US); Richard D. Jinkins, Rewey, WI (US); Richard M. Rademaker, Rijswijk (NL)

(73) Assignee: Rockwell Collins, Inc., Cedar Rapids, IA (US)

( * ) Notice: Subject to any disclaimer, the term of this patent is extended or adjusted under 35 U.S.C. 154(b) by 1323 days.

(21) Appl. No.: 12/236,464

(22) Filed: Sep. 23, 2008

(51) Int. Cl.
*G01S 13/94* (2006.01)
*G01S 13/95* (2006.01)
*G01S 13/86* (2006.01)

(52) U.S. Cl.
CPC . *G01S 13/95* (2013.01); *G01S 13/86* (2013.01)
USPC ............................. 701/448; 342/26 B; 342/64

(58) Field of Classification Search
USPC .......................................................... 342/64
See application file for complete search history.

(56) References Cited

U.S. PATENT DOCUMENTS

| | | | |
|---|---|---|---|
| 2,930,035 A | 3/1960 | Altekruse | |
| 2,965,894 A | 12/1960 | Sweeney | |
| 2,994,966 A | 8/1961 | Senitsky et al. | |
| 3,153,234 A | 10/1964 | Begeman et al. | |
| 3,212,088 A | 10/1965 | Alexander et al. | |
| 3,241,141 A | 3/1966 | Wall | |
| 3,325,807 A | 6/1967 | Burns et al. | |
| 3,373,423 A | 3/1968 | Levy | |
| 3,397,397 A | 8/1968 | Barney | |
| 3,739,380 A | 6/1973 | Burdic et al. | |
| 3,815,132 A | 6/1974 | Case, Jr. et al. | |
| 3,866,222 A | 2/1975 | Young | |
| 4,654,665 A | 3/1987 | Kiuchi et al. | |
| 4,760,396 A | 7/1988 | Barney et al. | |
| 5,945,926 A | 8/1999 | Ammar et al. | |
| 6,233,522 B1 * | 5/2001 | Morici | ........................... 701/208 |
| 6,278,799 B1 | 8/2001 | Hoffman | |
| 6,388,607 B1 | 5/2002 | Woodell | |
| 6,424,288 B1 | 7/2002 | Woodell | |
| 6,512,527 B1 | 1/2003 | Barber et al. | |
| 6,603,425 B1 | 8/2003 | Woodell | |
| 6,690,298 B1 | 2/2004 | Barber et al. | |
| 6,690,317 B2 * | 2/2004 | Szeto et al. | ................. 342/26 R |
| 6,799,095 B1 | 9/2004 | Owen et al. | |

(Continued)

OTHER PUBLICATIONS

Carter, S. P., D. D. Blankenship, M. E. Peters, D. A. Young, J. W. Holt, and D. L. Morse (2007), Radar-based subglacial lake classification in Antarctica, Geochem. Geophys. Geosyst., 8, Q03016, doi:10.1029/2006GC001408.*

(Continued)

*Primary Examiner* — Anita Coupe
(74) *Attorney, Agent, or Firm* — Angel N. Gerdzhikov; Donna P. Suchy; Daniel M. Barbieri (57) ABSTRACT

An apparatus for use with a weather radar system having a radar antenna, the apparatus for mounting to an aircraft and for verifying terrain features shown on an electronic display, the terrain features based on terrain data from a terrain database. The apparatus includes processing electronics configured to receive radar return data from the weather radar system and configured to correlate the radar return data with the terrain data. The processing electronics using the correlation to provide an indication as to whether the terrain features displayed on the electronic display are correct or incorrect.

20 Claims, 8 Drawing Sheets

(56) References Cited

U.S. PATENT DOCUMENTS

| | | | |
|---|---|---|---|
| 7,023,375 | B2 | 4/2006 | Klausing |
| 7,026,956 | B1 | 4/2006 | Wenger et al. |
| 7,053,796 | B1 | 5/2006 | Barber |
| 7,057,549 | B2 | 6/2006 | Block |
| 7,064,680 | B2 | 6/2006 | Reynolds et al. |
| 7,098,913 | B1 | 8/2006 | Etherington et al. |
| 7,109,913 | B1 | 9/2006 | Paramore et al. |
| 7,123,260 | B2 | 10/2006 | Brust |
| 7,180,476 | B1 | 2/2007 | Guell et al. |
| 7,191,406 | B1 | 3/2007 | Barber et al. |
| 7,307,583 | B1 * | 12/2007 | Woodell et al. ............... 342/173 |
| 7,352,292 | B2 | 4/2008 | Alter et al. |
| 7,375,678 | B2 | 5/2008 | Feyereisen et al. |
| 7,379,796 | B2 | 5/2008 | Walsdorf et al. |
| 2002/0158256 | A1 | 10/2002 | Yamada et al. |

OTHER PUBLICATIONS

Adams, Charlotte, "Synthetic Vision: Picturing the Future," *Avionics magazine, Solutions for Global Airspace Electronics*, Oct. 2006, cover and pp. 22-29.

Adams, Charlotte, "Synthetic Vision: Picturing the Future," *Avionics magazine*, Oct. 1, 2006, printed from website www.aviationtoday.com, 4 pages.

Blue Mountain Avionics' Products, printed from website www.bluemountainavionics.com on Aug. 28, 2007, 4 pages.

"MountainScope™ on a TabletPC," PCAvionics™, printed from website www.pcavionics.com on Aug. 28, 2007, 1 page.

Pictures of DELPHINS, printed from website www.tunnel-in-the-sky.tudelft.nl on Aug. 28, 2007, 4 pages.

"TAWS Terrain Awareness and Warning System," Universal® Avionics, printed from website www.uasc.com on Aug. 28, 2007, 2 pages.

TAWS Class A and Class B, Terrain Awareness and Warning Systems, Universal® Avionics Systems Corporation, Sep. 2007, 6 pages.

Technical Standard Order, TSO-C115b, Airborne Area Navigation Equipment Using Multi-Sensor Inputs, Sep. 30, 1994, 11 pages, Department of Transportation, Federal Aviation Administration, Washington, DC.

Van Kasteren, Joost, :Tunnel-in-the-Sky, Synthetic vision simplifies the pilot's job and enhances safety, printed from website www.delftoutlook.tudelft.nl on Aug. 28, 2007, 13 pages.

* cited by examiner

SYSTEM AND METHOD FOR VERIFYING DISPLAYED TERRAIN INFORMATION

CROSS-REFERENCE TO RELATED PATENT APPLICATIONS

The present application is related to co-pending application Ser. No. 11/851,323 filed on Sep. 6, 2007 and Ser. No. 11/904,491 filed on Sep. 26, 2007, both of which are herein incorporated by reference.

BACKGROUND

The present disclosure relates generally to the field of an apparatus for use with a weather radar system including an antenna and an electronic display. The disclosure more specifically relates to an apparatus and method for verifying terrain features shown on an electronic display.

Terrain display systems can use an electronic display to relay data to a flight crew. The data can be important information relating to altitude, attitude, terrain features, etc. However, the accuracy of data displayed by conventional systems can be erroneous (e.g. relative to the actual location of the aircraft). This may result in hazardously misleading information being supplied to the flight crew. Furthermore, conventional terrain display systems can be augmented by ground based infrastructure systems such as ADS-B systems. Aircraft using such a conventional terrain display system cannot use these augmentations without nearby proper external infrastructure.

There is a need for improved terrain display systems configured to correct or warn flight crews of erroneous information.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the disclosure relates to an apparatus for use with a weather radar system including a radar antenna. The apparatus can be mounted to an aircraft and used for verifying terrain features shown on an electronic display. The terrain features are based on terrain data from a terrain database. The apparatus includes processing electronics configured to receive radar return data from the weather radar system and configured to correlate the radar return data with the terrain data. The processing electronics can use the correlation to provide an indication as to whether the terrain features displayed on the electronic display are correct or incorrect.

Another embodiment of the disclosure relates to a method for verifying terrain features shown on an electronic display, the method for use with a weather radar system on an aircraft including a radar antenna. The terrain features can be based on data from a terrain database. The method includes receiving radar return data from the weather radar system, correlating the radar return data with the terrain data using processing electronics provided on the aircraft, and using the correlation to provide an indication as to whether the terrain features displayed on the electronic display are correct or incorrect.

A further embodiment of the disclosure relates to an apparatus for use with a weather radar system including a radar antenna, the apparatus for mounting to an aircraft and for verifying terrain features shown on an electronic display. The terrain features can be based on data from a terrain database. The apparatus includes means for receiving radar return data from the weather radar system, means for correlating the radar return data with the terrain data, and means for using the correlation to provide an indication as to whether the terrain features displayed on the electronic display are correct or incorrect.

BRIEF DESCRIPTION OF THE DRAWINGS

The disclosure will become more fully understood from the following detailed description, taken in conjunction with the accompanying drawings.

DETAILED DESCRIPTION OF THE EXEMPLARY EMBODIMENTS

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring generally to the figures, a system and method for correlating radar and terrain data is shown. The system can include an electronic display, weather radar system, apparatus, navigational equipment and terrain system. The method can include correlating terrain features based on at least one of verifying a terrain tile displayed by the electronic display, matching a terrain profile covered by the radar return data, verifying a location of hill tops, verifying a location of shadows, verifying a location of hydrology, verifying a location of a horizon line within the radar sweep, and matching segments of a terrain profile covered by the radar return data.

Figure 1:
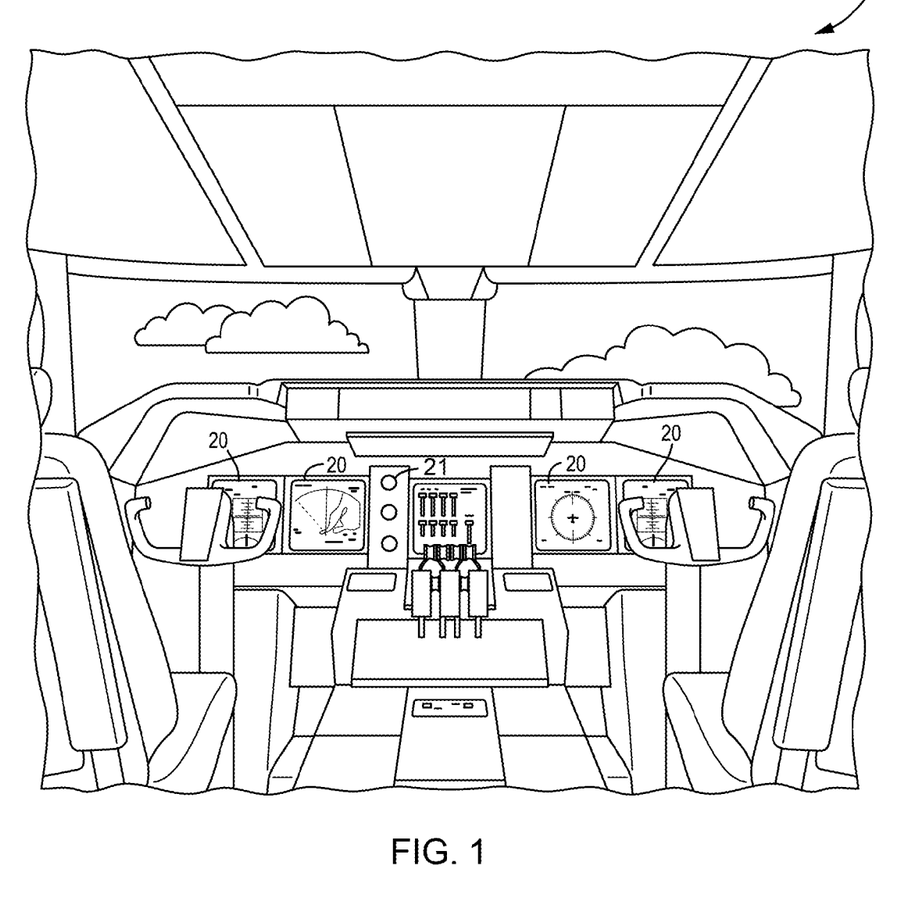
FIG. 1 is an illustration of an aircraft control center or cockpit, according to an exemplary embodiment.

Referring to FIG. 1, an illustration of an aircraft control center or cockpit 10 is shown, according to one exemplary embodiment. Aircraft control center 10 includes flight displays 20. Flight displays 20 can be used to provide information to the flight crew, thereby increasing visual range and enhancing decision-making abilities. According to an exemplary embodiment, at least one of the displays of the flight displays 20 is configured to provide an indication to a flight crew as to whether the terrain features displayed on the electronic display are correct or incorrect.

In an exemplary embodiment, flight displays 20 can provide an output from a radar system of the aircraft. Flight displays 20 can include a weather display, a joint display, a weather radar map and a terrain display. Further, flight displays 20 may include an electronic display or a synthetic vision system (SVS). For example, flight displays 20 can include a display configured to display a three dimensional perspective image of terrain and/or weather information. Other view of terrain and/or weather information may also be provided (e.g. plan view, horizontal view, vertical view, etc.). Additionally, flight displays 20 can be implemented using any of a variety of display technologies, including CRT, LCD, organic LED, dot matrix display, and others. Flight displays 20 can also include head-up displays (HUD) with or without a projector.

Aircraft control center 10 additionally includes one or more user interface (UI) elements 21. UI elements 21 can include dials, switches, buttons, touch screens, or any other user input device. UI elements 21 can be used to adjust features of flight displays 20, such as contrast, brightness, width, and length. UI elements 21 can also (or alternatively) be used by an occupant to interface with or change the displays of flight displays 20. UI elements 21 can additionally be used to acknowledge or dismiss an indicator provided by flight displays 20. Further, UI elements 21 can be used to correct errors on the electronic display.

Figure 2:
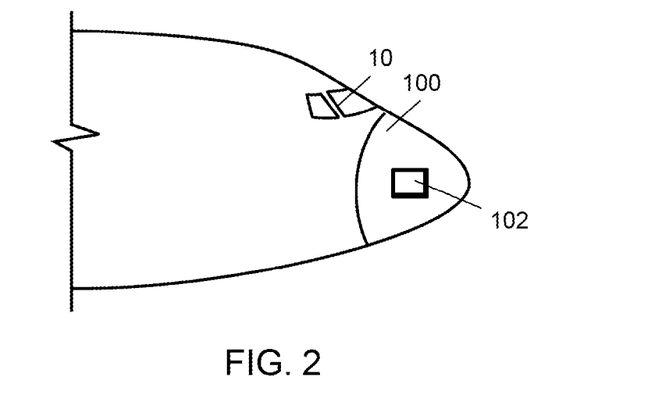
FIG. 2 shows the front of an aircraft with an aircraft control center and nose, according to an exemplary embodiment.

Referring to FIG. 2, the front of an aircraft is shown with aircraft control center 10 and nose 100, according to an exemplary embodiment. A radar system 102 is generally located inside nose 100 of the aircraft or inside a cockpit of the aircraft. According to other exemplary embodiments, radar system 102 can be located on the top of the aircraft or on the tail of the aircraft. Yet further, radar system 102 can be located anywhere on the aircraft. Furthermore, the various components of radar system 102 can be distributed at multiple locations throughout the aircraft. Additionally, radar system 102 can include or be coupled to an antenna system of the aircraft.

Figure 3A:
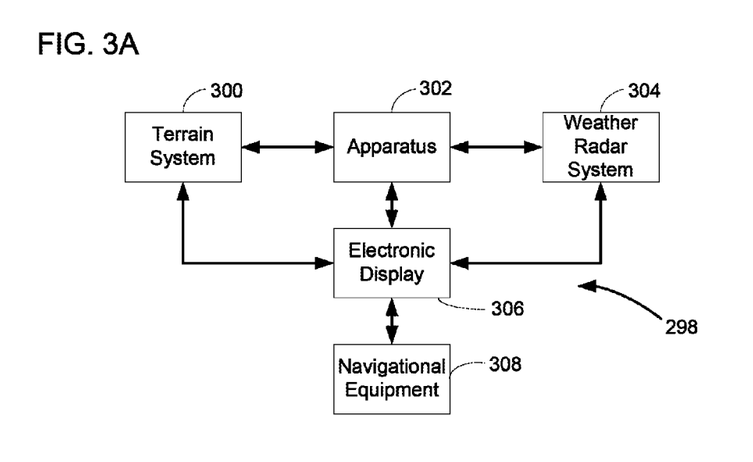
FIG. 3A is a block diagram of a radar system, according to an exemplary embodiment.

Referring to FIG. 3A, a pilot information system 298 is shown, according to an exemplary embodiment. Pilot information system 298 is shown to include a terrain system 300, apparatus 302, weather radar system 304, electronic display system 306 and navigational equipment 308. Terrain system 300 can be a system for retrieving terrain data. Terrain data retrieved from terrain system 300 can be communicated to electronic display system 306 for display to a user or to apparatus 302 for correlation. Weather radar system 304 can be a system for detecting weather patterns. Detected weather patterns can be communicated to a electronic display system 306 for display to a user or to apparatus 302 for determining weather free radials or areas of the radar return data for correlation. Additionally, navigational equipment 308 can output vital navigational information to electronic display system 306 for display to a user. Further, apparatus 302 can be used to correlate terrain data from terrain system 300 and/or to determine weather free radials or areas of the radar return data based on weather information from weather radar system 304. Furthermore, electronic display system 306 can be used to display outputs of various information from terrain system 300, apparatus 302, weather radar system 304, and navigational equipment 308.

Weather radar system 304 is generally configured to cast one or more radar beams from an aircraft mounted antenna, to receive returns, and to interpret the returns (e.g. for display to a user). Additionally, weather radar system 304 can generally perform multiple radar sweeps. The radar sweeps can include horizontal sweeps, vertical sweeps, or a combination of horizontal and vertical sweeps. Furthermore, the radar sweeps can be performed such that the radar sweeps are substantially orthogonal to one another. According to other exemplary embodiments, weather radar system 324 can be a monopulse radar system or a radar system with an aperture capable of switching modes.

Figure 3B:
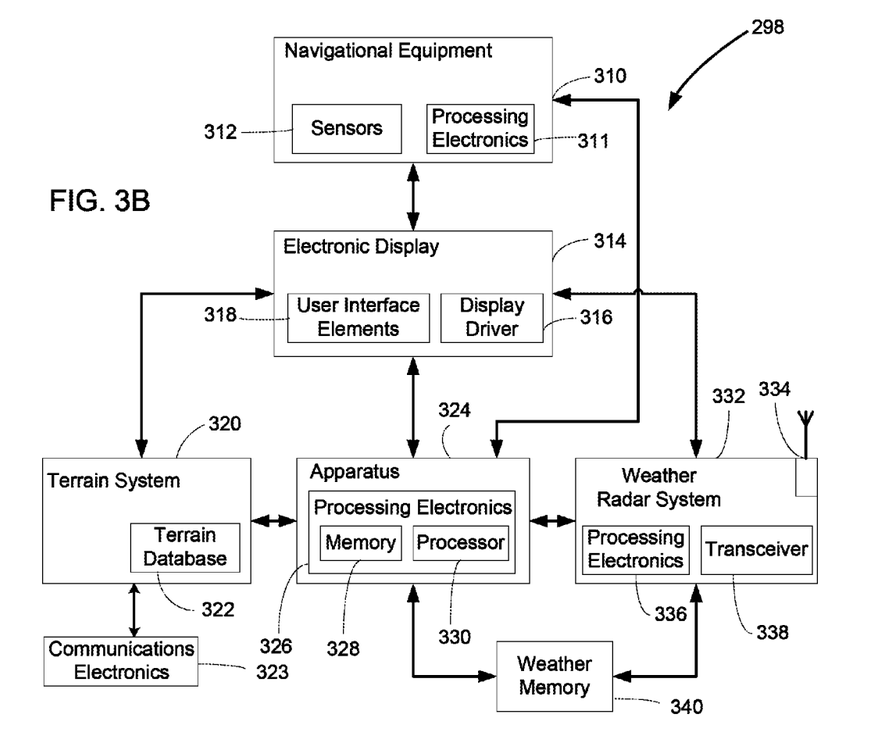
FIG. 3B is a block diagram of a radar system, according to a further exemplary embodiment.

Referring to FIG. 3B, a pilot information system 298 is shown in greater detail. Pilot information system 298 can include navigational equipment 310, electronic display system 314, terrain system 320, apparatus 324, and weather radar system 332.

Navigational equipment 310 can be used to determine vital navigational information and output aforementioned navigational information to an electronic display. For example, navigational equipment 310 can be used to output a determined attitude, heading, location, and altitude to an electronic display to assist the flight crew. Furthermore, navigational equipment 310 can include sensors 312 and processing electronics 311.

Sensors 312 can be any type of sensor used to determine various navigational information. For example, sensors 312 can include an altimeter for determining altitude. Further, sensors 312 can include GPS equipment for determining location.

Processing electronics 311 can be any hardware and/or software processor or processing architecture capable of executing instructions and operating on navigational data. Processor 311 can be capable of determining navigational information such as altitude, heading, bearing, and location based on data from sensors 312.

Electronic display system 314 can be used to display information from navigational equipment 310, terrain system 320, apparatus 324, and weather radar system 332. Electronic display system 314 can include UI elements 318, display 20, and display driver 316. Display driver 316 can be any computer hardware and/or software that enables the electronic display system 314 to communicate with and receive data from various other components. UI elements 318 can be used to apply corrections to data shown on display 20. For example, UI elements 318 can be used to select a proper terrain tile for a given location. Input received from UI elements 318 is processed by display driver 316. Display driver 316 can then communicate the received input to various other components.

Terrain system 320 is generally a system configured to provide terrain data for display to a user via electronic display system 314. Terrain system 320 can also include a terrain database 322. Terrain database 322 can contain information on geographical features corresponding to various regions. Terrain database 322 can be stored in a volatile or non volatile memory device of or accessible by system 298. Further, terrain system 320 can include or be coupled to communications electronics 323 for receiving terrain information from an exterior source.

Weather radar system 332 can be used to detect weather patterns in the vicinity of the aircraft. Further, weather radar system 332 can provide weather related information to electronic display 314, apparatus 324, and weather memory 340. Weather radar system 332 can also store weather related data in weather memory 340 for later access. Weather radar system 332 can include an antenna 334, processing electronics 336, and transceiver 338. Transceiver 338 is configured to transmit radar signals and to receive radar returns via antenna 334.

Antenna 334 can be used to perform a radar sweep detecting weather information. In addition to use for weather detection, antenna 334 can also receive return signals from a radar sweep. Antenna 334 is also used to detected ground/terrain features and information. The tilt of antenna 334 can also be controlled, thereby enabling multiple steered radar sweeps to be cast at multiple tilt angles.

Processing electronics 336 can be any hardware and/or software processor or processing architecture capable of executing instructions and processing radar returns. Any of the radar returns available to processing electronics 336 can be provided to apparatus 324 for further processing. For example, processing electronics 336 can be configured to examine return data from antenna 334, thereby determining regions of weather activity. Processing electronics 336 can also be used to tilt antenna 334, thereby enabling the ability to steer a radar sweep. Further, processing electronics 336 can be configured to construct a weather radar map based upon radar returns. The constructed weather radar map can be output to apparatus 324 and/or electronic display 314.

Apparatus 324 can be configured to verify terrain features shown on an electronic display. Apparatus 324 can be further configured to access weather memory 340 for determining radials not obscured by weather. Apparatus 324 can additionally be configured to communicate with weather radar system 332, terrain system 320, and electronic display 314. Apparatus 324 includes processing electronics 326. Processing electronics 326 can be any hardware and/or software processor or processing architecture capable of executing instructions (e.g., computer code stored in memory 328) and operating on various data types. Processing electronics 326 can also include memory 328. Memory 328 can be any volatile or non volatile memory.

Processing electronics 326 can be configured to determine a set of radials or areas of the radar return data for one or more vertical radar sweeps (e.g., a pair of vertical radar sweeps). Processing electronics 326 can determine radials by calculating acceptable ranges of scan angles to the left and right of or along the aircraft, searching the terrain database within each acceptable range of scan angles to find features that are easiest to correlate with or that provide better correlation, and/or by analyzing a weather radar map to avoid radials that are or may be obscured by weather.

Additionally, processing electronics 326 can be configured to receive return data from the weather radar system 332. Processing electronics 326 can be configured to use radar return data from weather radar system 332 to determine a navigation solution.

Processing electronics 326 can also be configured to correlate the radar return data from weather radar system 332 with the terrain data from terrain system 320. Processing electronics 326 are configured to correlate terrain data by comparing characteristics of the terrain data to the radar returns. For example, verifying terrain tile characteristics stored in memory or displayed by the electronic display. According to various exemplary embodiments, a terrain tile may be any portion of terrain data configured for displaying on the electronic display. Characteristics of the terrain tiles may include location data, elevation data, size data, distance data, or any other data that related to the terrain that the terrain tile represents and may be stored in terrain database 322.

Processing electronics 326 can also correlate data by matching a terrain profile with aggregate radar return data. According to various exemplary embodiments, a terrain profile may be an aggregate of the terrain data found by a radar scan (e.g., a vertical radar scan, a monopulse beam, etc.) or an aggregate of the processed terrain tiles and may be stored in terrain database 322. Processing electronics 326 can also (or alternatively) correlate data by verifying a location of hill tops, verifying a location of shadows, verifying a location of hydrology, and/or by verifying a location of a horizon line within the radar sweep. Additionally, processing electronics 326 can correlate data by attempting to match segments of a terrain profile related to the radar return data of a radar scan. For example, individual terrain tiles or individually detected terrain features can be matched with the radar return data.

Processing electronics 326 can correlate radar sweeps with expected terrain types or characteristics, by searching for shadows or hill tops in a vertical sweep, and/or looking for a horizon line. For example by searching for shadows or hill tops in a bottom half of a vertical sweep while looking for a horizon line in a top half of the vertical sweep. Additionally, correlation can be conducted based on the aircraft position above, next to, and/or below surrounding terrain.

Processing electronics 326 can determine terrain types for correlation using radar range information, azimuth information, and elevation information provided by navigational equipment 310, terrain system 320, and/or weather radar system 332. For example, processing electronics may determine the presence of a hill top if the elevation information, azimuth information, and/or range information received from navigational equipment 310, terrain system 320, and/or weather radar system 332 rapidly decreases and then holds generally steady or increases thereafter. Processing electronics 326 can determine the presence of a shadow if the elevation information, azimuth information, and/or range information received from navigational equipment 310, terrain system 320, and/or weather radar system 332 rapidly increases after a hill top. There may be a region on the opposite side of the hill in which the radar scan cannot transmit a radar beam. Processing electronics 326 can determine the presence of hydrology if there are fewer radar returns in a particular area as compared to surrounding areas. Most rivers, lakes, and streams act like mirrors (e.g., specular reflectors) and produce many fewer radar returns than the ground around them. These regions of low reflectivity can be matched to water dominated features in a database (e.g., terrain database 322). Processing electronics 326 can determine the location of the horizon line if radar return data is no longer received at a specific angle.

When processing electronics 326 determine by correlation that the terrain data may be obscured by weather or other factors, processing electronics 326 can provide an indication that terrain features displayed on electronic display 314 are incorrect. The indicator can be displayed as an element on UI elements 21. The indicator can also be displayed on display 20.

Incorrect terrain features may be indicative of loading an incorrect terrain tile for use by electronic display system 314. Incorrect terrain features may additionally result from displaying an incorrect navigation solution on display 20 as determined by navigational electronics 310. Incorrect terrain features may also result from displaying an incorrect attitude or heading solution on display 20 as determined by navigational electronics 310.

Figure 3C:
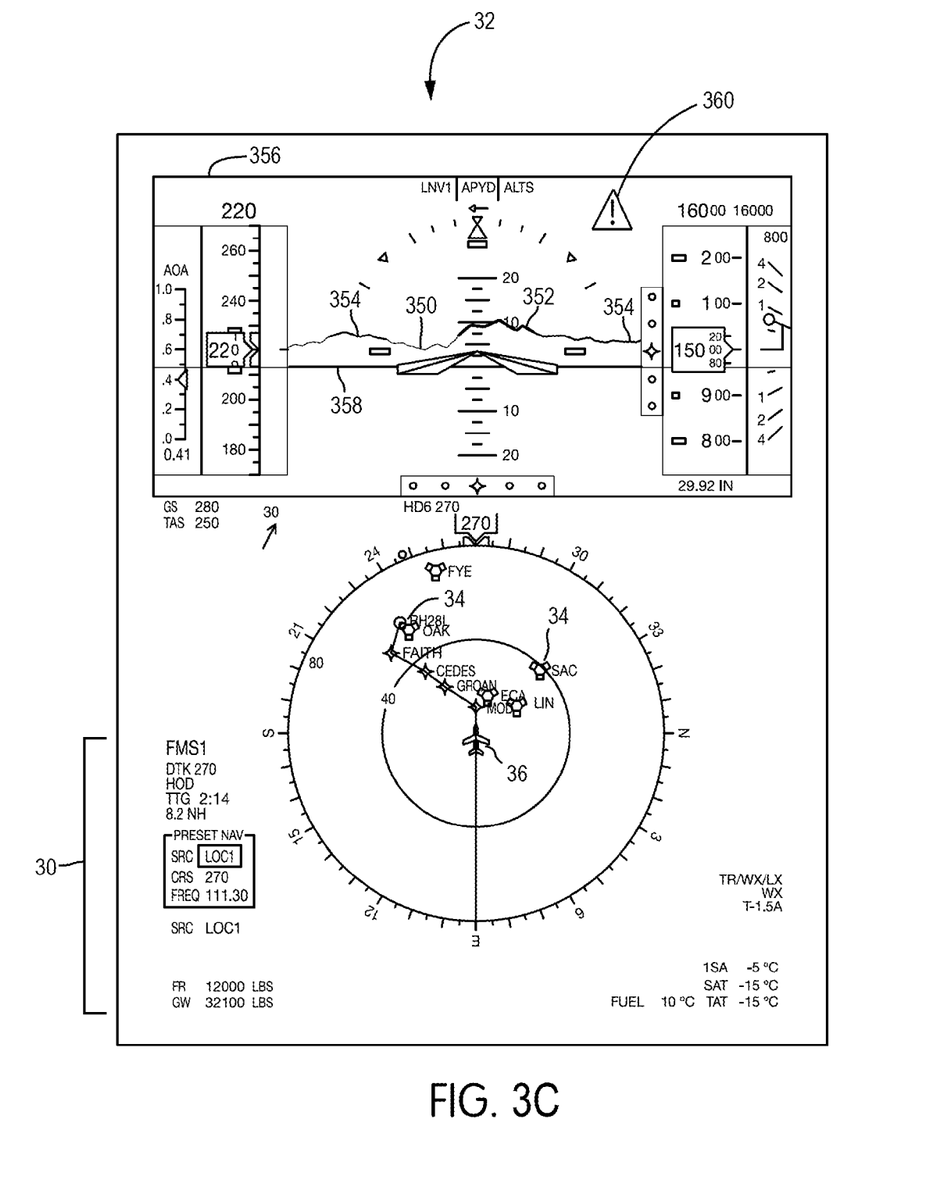
FIG. 3C is an illustration of a synthetic vision information terrain display screen, according to an exemplary embodiment.

Referring to FIG. 3C, an electronic display 32 is shown, according to an exemplary embodiment. Electronic display 32 may include a three-dimensional perspective image 356 and flight characteristics display 30. Flight characteristics display 30 includes airplane position 36 and navaids 34. Electronic display 32 includes a terrain view 358 that illustrates a high terrain 352, a medium terrain 354 and a low terrain 350. According to an exemplary embodiment, the color of high terrain 352, medium terrain 354 and low terrain 350 may be configured to be different colors to allow the aircrew to quickly recognize a potential hazard. In another exemplary embodiment, high terrain 352 may be configured to flash, enlarge, turn red or any combination thereof to provide a warning signal to the aircrew. Furthermore, electronic display 32 may be configured to provide an indicator 360 as to whether terrain features displayed are correct or incorrect. Indicator 360 can be an icon, text, string, symbol, synthetic image, LED indicator, audible tone, or any other visible and/or audible alarm provided by electronic display 32, another aircraft display, an audio system, etc. Processing electronics 326 can be configured to flash the indicator, enlarge the indicator, change colors of the indicator, display text, or any combination thereof. Processing electronics 326 can also be configured to cause a speaker or an audio system to provide an audible indication.

Figure 4:
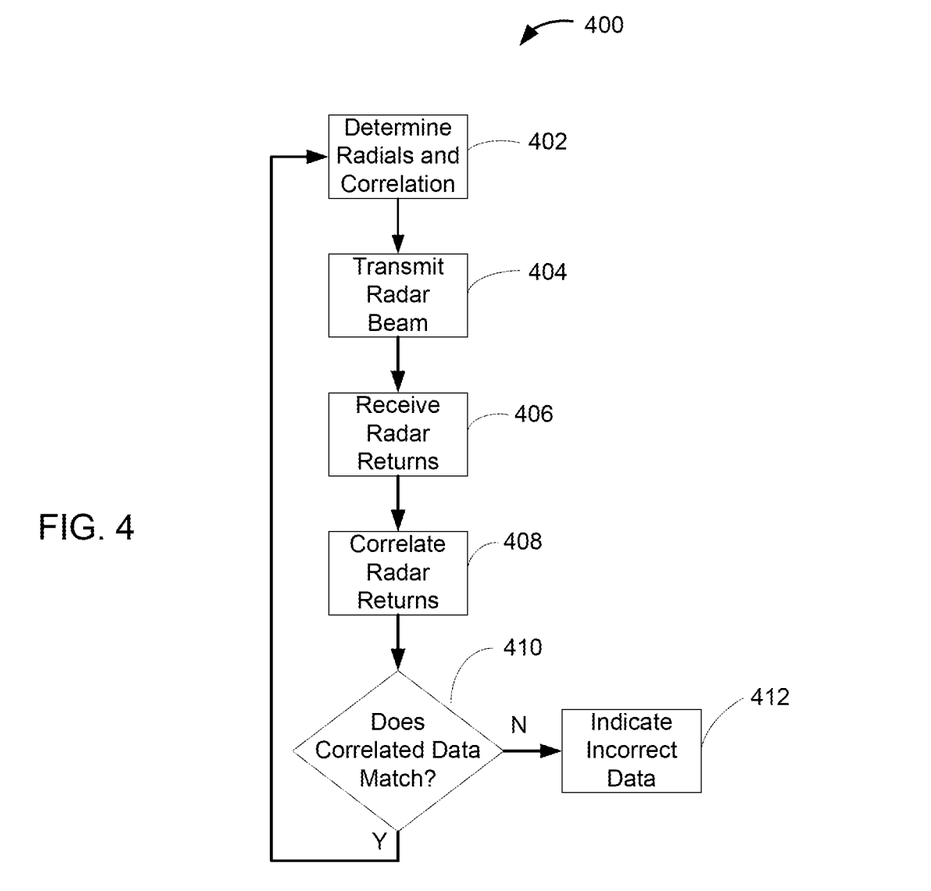
FIG. 4 is a process flow diagram of a method for correlating radar and terrain data, according to an exemplary embodiment.

Referring to FIG. 4, a process flow diagram of a method 400 for correlating radar and terrain data for an electronic display (e.g., electronic display 32) is shown, according to an exemplary embodiment. Processing electronics 326 determines set of radials and a method of correlation (step 402) for radar sweeps. After determining a set of radials and a method of correlation, weather radar system 304 or 332 transmits a radar beam (step 404), for example a pair of orthogonal vertical radar sweeps or a monopulse beam.

Once weather radar system 304 or 332 receives data from a radar return (step 406), processing electronics 326 correlates the data from the radar return to data stored in terrain database 322, data received from navigational equipment 310 (e.g., GPS data), and/or data displayed on display 32 (step 408). The correlation in step 408 may be based on verifying terrain information displayed by the electronic display, for example a terrain tile. The correlation can also (or alternatively) be based on an attempt to match a terrain profile with the radar return data. Additionally, correlation can be based on attempting to verify one or more distinctive terrain feature within a radar sweep, for example hill tops, shadows, hydrology, and/or a horizon line. Further, correlation can be based on matching segments of a terrain profile for which radar data is returned in a radar sweep. The locations of the aforementioned terrain features can be determined using radar range information, azimuth information, and elevation information as described above.

Processing electronics 326 determine whether or not the radar return data correlated in to the stored or displayed terrain data in step 408 matches (step 410) (e.g., whether a high degree of correlation or matching between the terrain data and radar return data exists). When the correlated data matches the data from terrain database 322, data received from navigational equipment 310, and/or data displayed on display 32, the method may return to step 402 to repeat the process.

When the correlated data in step 408 does not match, processing electronics 326 may indicate that the terrain data used (e.g., displayed or stored) was incorrect (step 412). For example, the terrain data stored in terrain database 322 may be from a horizontal radar scan affected by weather such as rain. Alternatively, a component in system 298 may have failed and/or provided erroneous data. Incorrect terrain features can also be indicative of loading an incorrect terrain tile for use by the electronic display, using an incorrect navigation solutions for the electronics, and/or using an incorrect attitude or heading solution for the electronic display. According to some exemplary embodiments and depending on the correlation technique implemented, processing electronics 326 can attempt to isolate which component failed or provided erroneous data.

Figure 5:
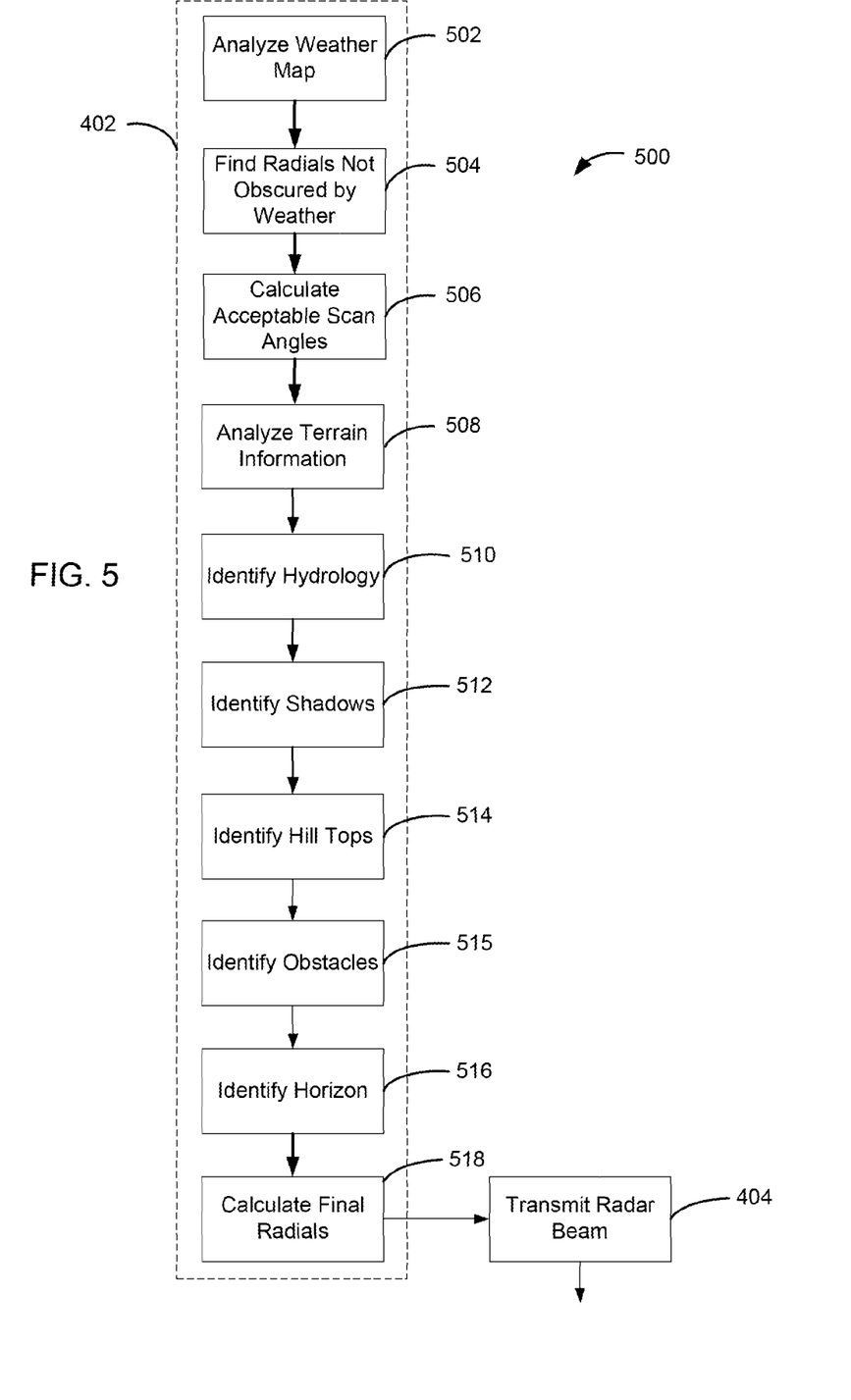
FIG. 5 is a process flow diagram of a method for calculating a set of radials, according to an exemplary embodiment.

Referring to FIG. 5, a process flow diagram of a method 500 for calculating a set of radials (as in step 402 of method 400) using processing electronics 326 is shown, according to an exemplary embodiment. Processing electronics 326 analyzes a weather map (step 502) to determine radials that will not be obscured by weather (step 504). Processing electronics 326 can subsequently calculate acceptable scan angles (step 506) to the left and right of or along the aircraft for a radar sweep, based on the radials determined to not be obscured by weather as determined in step 504.

After determining acceptable scan angles, processing electronics 326 can analyze terrain information (e.g., one or more terrain tiles) (step 508) from the terrain database for geographic features to correlate with. Processing electronics 326 can determine terrain types for correlation using radar range information, azimuth information, and elevation information provided by navigational equipment 310, terrain system 320, and/or weather radar system 332. A terrain tile can refer to a segment of terrain as stored in memory or shown on a display, preferably one that includes prominent geographical features. The terrain tile can be of any size, for example a size suitable for subdividing the different terrain features of a terrain profile.

Based on the analyzed terrain tile from step 508, processing electronics 326 can attempt to identify hydrology (step 510). Hydrology can be identified by using a radar system to search for a shoreline of a river, ocean, lake, etc. Most rivers, lakes, and streams act like mirrors (e.g., specular reflectors) and produce many fewer radar returns than the ground around them. These regions of low reflectivity can be matched to water dominated features in a database (e.g., terrain database 322).

Processing electronics 326 can also attempt to identify shadows (step 512). Shadows can be identified by using a radar beam to search the vicinity of a geographical feature to locate a shadow cast by the geographical feature. For example, if the range information, azimuth information, and/or or elevation information associated with radar returns rapidly increases after a hill top. There may be a region on the opposite side of the hill in which the radar scan cannot transmit a radar beam.

Further, processing electronics 326 can attempt to identify hill tops (step 514). Hill tops can be identified by using a radar to search for the tip of a hill top by detecting if the elevation information, azimuth information, and/or range information rapidly decreases and then holds generally steady or increases thereafter. Further, processing electronics 326 can attempt to identify man-made obstacles (step 514), for example towers, bridges, power lines, etc. Obstacles can be identified using radar elevation information, azimuth information, and/or range information with a database storing information on man-made obstacles.

Additionally, processing electronics 326 can attempt to identify a line to the horizon (step 516). A line to the horizon can be identified by pointing a radar directly at the horizon and searching for returns. The angle at which radar return data is no longer received may indicate the horizon.

Processing electronics 326 can then calculate a final set of radials (step 518) for performing a radar sweep. The final radials calculated in step 518 may be determined based on radials not obscured by weather as determined in step 502 and/or the most prominent geographic features identified via radar in steps 510-516. After the radials are determined, the system may transmit a radar beam as method 400 continues.

Furthermore, it should be appreciated that the specific sequences of processes shown in the embodiment of FIG. 5 are by way of example only. For example, the method may identify geographical features (steps 508-514) before identifying radials not obscured by weather (step 502). Furthermore, the sequence shown in steps 508 through 514 can be conducted in any order. For example, the method can identify hill tops before shadows, identify a horizon line before hydrology, or any combination thereof. According to other exemplary embodiments, other terrain data may be identified or some of steps 510-516 can be omitted.

Figure 6:
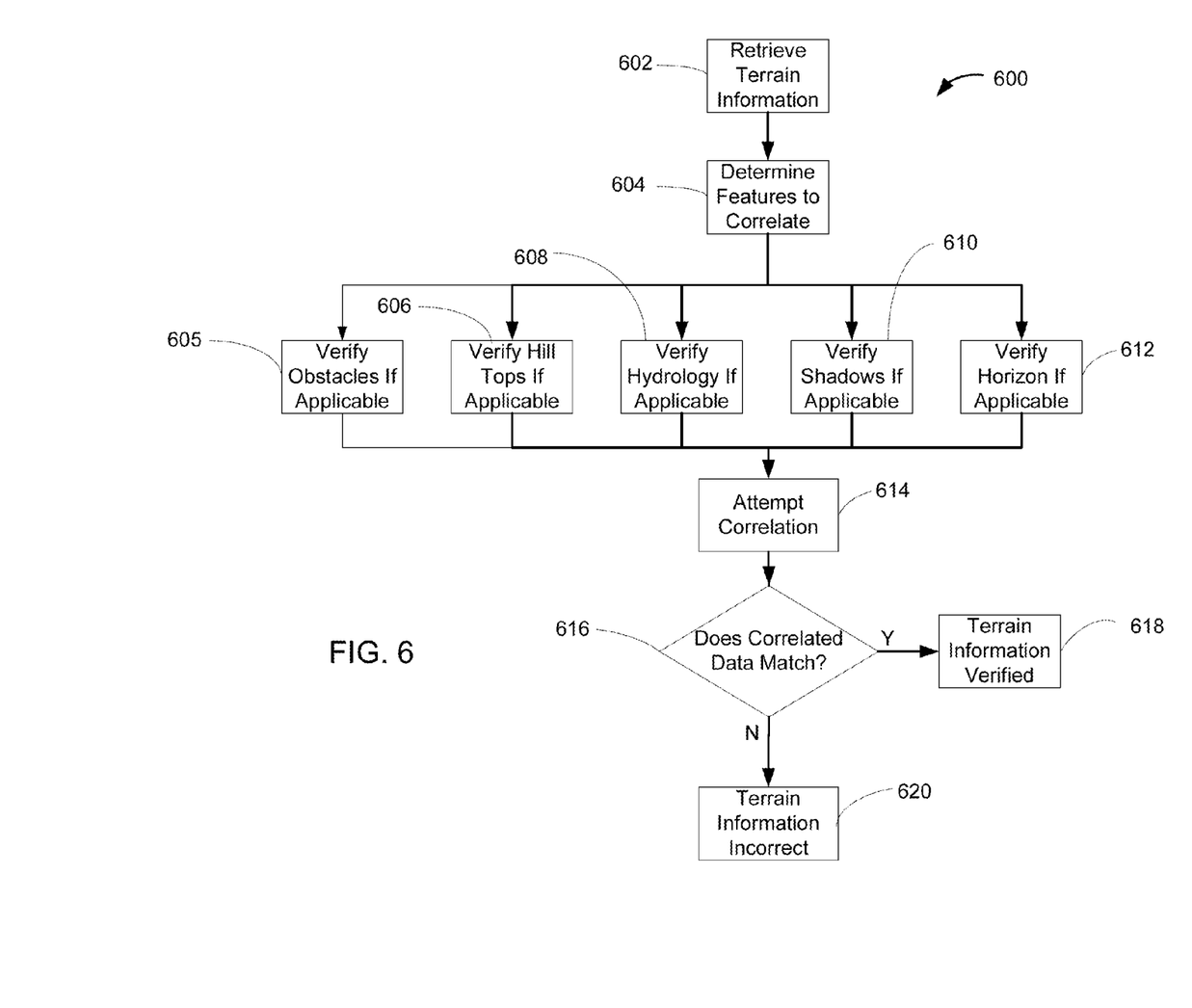
FIG. 6 is a process flow diagram of a method for correlating radar returns, according to an exemplary embodiment.

Referring to FIG. 6, a process flow diagram of a method 600 for correlating radar returns using processing electronic 326 is shown, according to an exemplary embodiment. Processing electronics 326 retrieves terrain information (step 602), for example data from terrain database 322 and/or data from radar returns. The method then examines the terrain information from step 602 to determine the easiest or best features to examine for correlation of radar returns (step 604). The easiest or best features to correlate with can be determined based on geographical region and/or specific characteristics. For example, in a coastal region or oceanic region, processing electronics 326 may attempt to correlate a location of shorelines of hydrology and/or a location of the horizon with return data. In a further example, processing electronics 326 may attempt to correlate return data with hill tops and/or shadows in a relatively flat, plain type region with little radar returns.

Following step 604, processing electronics 326 can attempt to verify the location of terrain features as applicable (steps 605-612). The terrain features can be verified based on radar range, azimuth, and elevation data provided by a radar sweep. For example, processing electronics 326 can determine or verify the location of man-made obstacles (step 605, hill tops (step 606), hydrology (step 608), shadows (step 610), and/or a horizon line within a radar sweep (step 610). Locations of shadows from return data and/or a terrain database may vary based on time of day and time of year. The locations of the terrain features in steps 606-612 can also be determined based on additional information. For example, the locations of geographical features can additionally be determined based on longitude and latitude.

Following attempts to verify locations of geographical features in steps 606-612, processing electronics 326 can attempt to correlate geographical features (step 614). Correlation of geographical features includes comparing the location of features as determined by radar return data to the location of features based on data stored in a terrain database. For example, when attempting to correlate a hill top, the method can compare the elevation, longitude, and latitude of a hill top as determined by radar return data to the elevation, longitude, and latitude based on data stored in a terrain database. Additionally, the method can compare similar data returned by a radar return sweep to similar data stored in a terrain database to attempt to correlate shadows, hydrology, and/or a horizon line.

Following step 614, processing electronics 326 checks if the correlated return data and stored or display terrain data (e.g., stored in terrain database 322 or displayed on electronic display 32) matches (step 616). For example, if radar return data of elevation, longitude, and latitude of a hill top matches elevation, longitude, and latitude data stored in a terrain database, then display 32 can indicate that the terrain information is correct, for example verifying a terrain tile (step 618). If the radar return data does not match the data stored in a terrain database through attempts to verify locations of geographical features in steps 606-612, then display 32 can indicate that terrain information may be incorrect or erroneous (step 620).

Furthermore, it should be appreciated that correlation can be based off of any number of geographical features. For example, correlation could be based on one of verifying hill tops, hydrology, shadows, or a horizon. Further, correlation could be based on all of the aforementioned geographical features, or any other combination thereof. Additionally, correlation could be based on additional geographical features than those shown. For example, correlation could be based on cultural items such as buildings, roads, etc.

Figure 7:
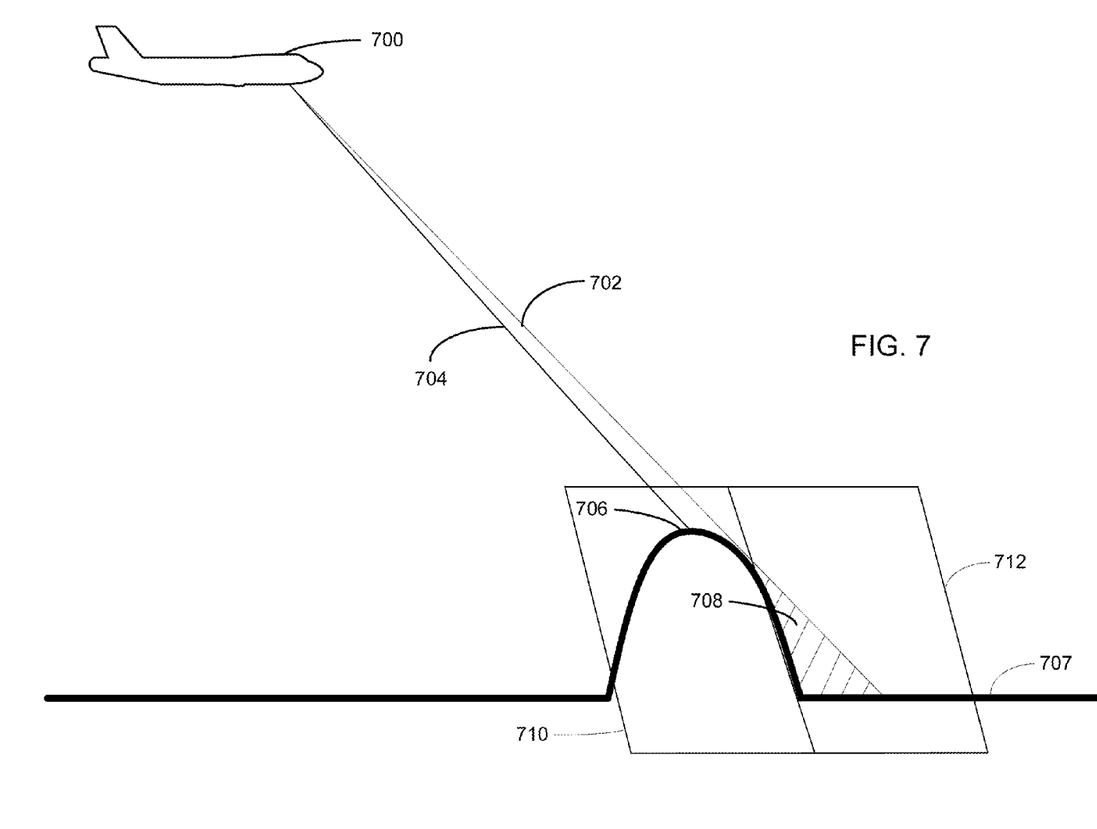
FIG. 7 is an illustration of an aircraft radar system performing a radar sweep to verify terrain features, according to an exemplary embodiment.

Referring to FIG. 7, an illustration of an aircraft radar system is shown, according to an exemplary embodiment. An aircraft 700 is shown performing a radar sweep comprising a first radar beam 702 and a second radar beam 704. The radar sweep can be a horizontal sweep, a pair of vertical sweeps, a monopulse beam sweep or a mixed mode sweep. The first radar beam 702 and second radar beam 704 can be either vertically polarized or horizontally polarized. Additionally, the first radar beam 702 and second radar beam 704 can be orthogonal to each other.

First radar beam 702 and second radar beam 704 are shown targeting two geographical features, a hill top 706 and a ground surface 707 beyond hill top 706. Second radar beam 704 casts beyond hill top 706 revealing a shadow area 708 where radar beams cannot reach at the current position of aircraft 700. Hill top 706 lies within a first terrain tile 710 (e.g., as used for display 32) while shadow 708 lies within a second terrain tile 712 (e.g., as used for display 32). First terrain tile 710 and second terrain tile 712 can correspond to a specific location or area within a terrain database (e.g., terrain database 322) or an area or location of any size or shape within the terrain database.

As shown in FIG. 7, an aircraft 700 is performing two methods of correlation, according to an exemplary embodiment. The first radar beam 702 is directed at ground surface 707 and shadow 708 lies in second terrain tile 712. The aircraft 700 may receive return data from first radar beam 702 and second radar beam 704 and processing electronics 326 may identify the location of shadow 708 based on radar range, elevation, and/or azimuth information. Shadow 708 can be any region on the terrain inaccessible by a radar beam. For example, shadow 708 can be a shadow cast by a feature such as a hill or building where radar beams cannot reach.

Second radar beam 704 is directed at the top of a hill 706. Hill 706 lies in first terrain tile 710. Aircraft 700 may receive additional return data from second radar beam 704 relating to the location of hill 706. Hill 706 can refer to any prominent feature, geographical or man made. For example, hill 706 can be a mountain or plateau or a prominent man made structure such as a skyscraper.

Upon receiving and processing return data from first radar beam 702 and second radar beam 704, processing electronics can attempt to correlate hill 706 and shadow 708. The correlation can be based on the location of hill 706 and shadow 708 according to return data from first radar beam 702 and second radar beam 704. Correlation can additionally be based on locations of hill 706 and shadow 708 within first terrain tile 710 and second terrain tile 712.

If the locations of hill 706 and/or shadow 708 according to the radar return data does not match the locations of hill 706 and/or shadow 708 according to the stored terrain information, processing electronics 326 can alert the flight crew of possible erroneous data (e.g., via display 32 or an audible prompt). If the locations from the radar return data matches the locations of terrain tile data, the stored or displayed data is correct and no alert is necessary.

Additionally, the aforementioned method can be preferably employed in relatively flat regions, where lack of radar returns can make correlation difficult. For example, the method could be used in a plain area. The method could also be used in areas with few geographical features and numerous man-made structures. For example, the method could attempt to correlate with shadows cast by prominent buildings or other landmarks.

Figure 8:
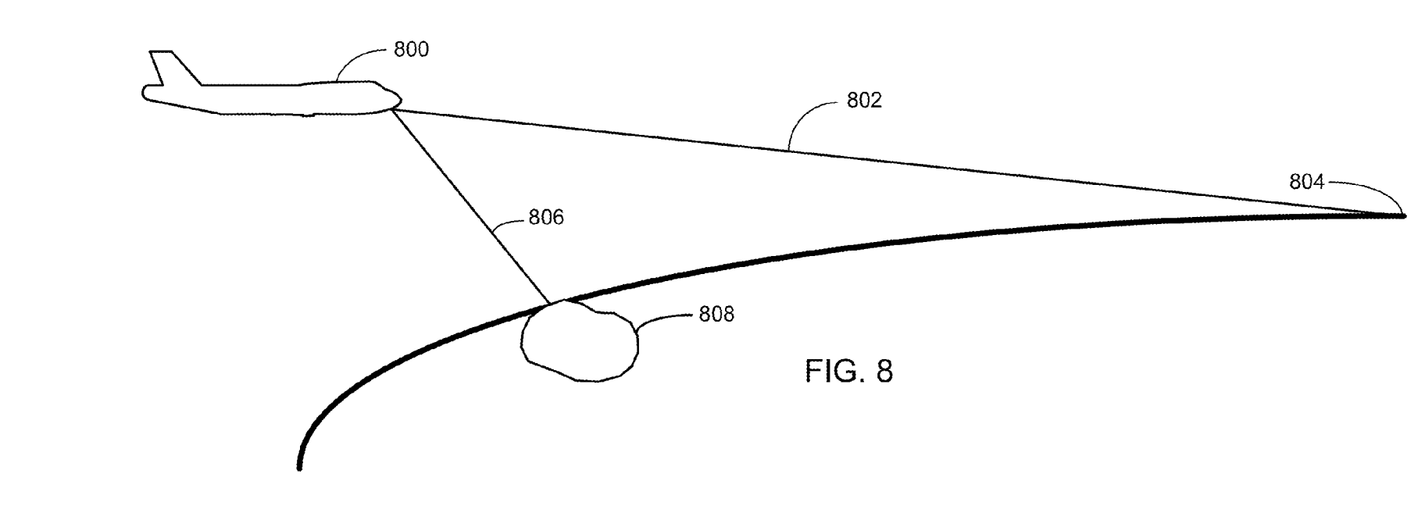
FIG. 8 is an illustration of an aircraft radar system performing a radar sweep to verify terrain features, according to another exemplary embodiment.

Referring to FIG. 8, an illustration of an aircraft radar system is shown, according to an exemplary embodiment. An aircraft 800 is shown performing radar sweeps comprising a first radar beam 802 and a second radar beam 806. Aircraft 800 is performing an additional two methods of correlation, according to an exemplary embodiment. First radar beam 802 is shown directed at a horizon 804. As a result, aircraft 800 may receive return data from first radar beam 802 related to the location of horizon 804.

Further, horizon 804 can be an exemplary reference point with which the determined position of hydrology can be compared. According to various other exemplary embodiments, distances between other terrain features can be determined. These determined real-world distances can be compared to distances as portrayed on the display.

Second radar beam 806 is shown directed at a region of hydrology 808. More specifically, second radar beam 806 may be directed at the shoreline of hydrology 808, resulting in more accurate radar returns. Thus, aircraft 800 may receive return data from second radar beam 806 relating to location of hydrology 808. Furthermore, hydrology 808 can be any body of water. For example, hydrology 808 may be a river, lake, etc.

Based on the return data, processing electronics 326 can attempt to correlate the locations of horizon 804 and hydrology 808. Correlation can be based on the locations of horizon 804 and hydrology 808 as determined by radar returns. Correlation can additionally be based on the locations of horizon 804 and hydrology 808 as determined by a terrain database. If the return data does not match the terrain database data, then the method can alert the flight crew of possible erroneous data. If the return data matches the terrain tile data, the stored or displayed data is correct and no alert is necessary.

Furthermore, the terrain locations can be determined using range, azimuth, and/or elevation data. As a result, return data from the first radar beam 802 and second radar beam 806 can be used for correlation to a terrain database. Additionally, the aforementioned method may be used in environments with low radar returns. For example, the aforementioned method may be used in a relatively flat region, and/or an aquatic environment.

Furthermore, it should be appreciated that the correlation methods of FIGS. 7 and 8 can be used in conjunction with each other, and in any combination thereof. For example, the method can employ correlation by hydrology and shadows, hill top and horizon, etc. Additionally, the aforementioned correlation method can be performed independently of an aircraft's navigation systems. For example, the method may use a Doppler weather radar system, independently of an aircraft's GPS navigation.

While the detailed drawings, specific examples, detailed algorithms, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. For example, the scope of the claims are intended to cover any technique that uses a selectable fractional aperture unless literally delineated from the claims. Furthermore, other substitutions, modifications, changes, and omissions may be made in the design, operating conditions, and arrangement of the exemplary embodiments without departing from the scope of the invention as expressed in the appended claims.

What is claimed is:

1. An apparatus for use with a weather radar system of an aircraft having a radar antenna, the apparatus for verifying terrain features shown on an electronic display as a perspective image of terrain, the terrain features based on terrain data from a terrain database and displayed as tiles in the perspective image of terrain, the apparatus comprising:
   processing electronics configured to receive radar return data from the weather radar system and configured to associate the radar return data with a displayed tile in the perspective image of terrain, wherein the processing electronics are further configured to provide an indication of whether the displayed tile corresponds to a physical characteristic of terrain in the associated radar return data, wherein the processing electronics analyzes weather data to determine radials obscured by weather, and wherein the processing electronics are further configured to adjust a radar scan angle in order to avoid the determined radials.

2. The apparatus of claim 1, wherein the perspective image of terrain is displayed by a synthetic vision system.

3. The aircraft radar system of claim 2, wherein the radar return data comprises radar return data from one or more vertical sweeps.

4. The aircraft radar system of claim 3, wherein the one or more vertical sweeps comprise vertical sweeps that are substantially orthogonal.

5. The aircraft radar system of claim 3, wherein a set of radials for-a pair of vertical sweeps is determined by at least one of: the processing electronics calculating acceptable ranges of scan angles to the left and right of or along the aircraft, or the processing electronics searching the terrain database within each acceptable range of scan angles to find a terrain feature that is better for associating with the displayed tile.

6. The aircraft radar system of claim 1, wherein the provided indication is indicative of at least one of: loading incorrect terrain data for use by the electronic display, using an incorrect navigation solution for the electronic display, or using an incorrect altitude or heading solution for the electronic display.

7. The aircraft radar system of claim 1, wherein the processing electronics are further configured to use the radar return data to determine a navigation solution.

8. The aircraft radar system of claim 1, wherein the indication of whether the displayed tile corresponds to the associated radar return data is determined by: matching a terrain profile covered by the radar return data, verifying a location of hill tops, verifying a location of shadows, verifying a location of hydrology, verifying a location of a horizon line within the radar sweep, and matching segments of a terrain profile covered by the radar return data.

9. The aircraft radar system of claim 8, wherein the processing electronics are further configured to determine a terrain location using range, azimuth, and elevation data.

10. The aircraft radar system of claim 8, wherein the radar return data is associated with a displayed tile in the perspective image of terrain based in part on the aircraft's position above, next to, or below surrounding terrain, based in part on expected terrain characteristics, by searching for shadows or hill tops in a vertical sweep, and by determining a horizon line.

11. A method of use with a weather radar system on an aircraft having a radar antenna, the method for verifying terrain features shown on an electronic display as a perspective image of terrain, the terrain features based on terrain data from a terrain database and displayed as tiles in the perspective image of terrain, the method comprising:
   analyzing weather data to determine radials obscured by weather, and adjusting a radar scan angle to avoid the determined radials;
   receiving radar return data from the weather radar system;
   associating the radar return data with a displayed tile in the perspective image of terrain using processing electronics provided on the aircraft; and
   providing an indication of whether the displayed tile corresponds to a physical characteristic of terrain in the associated radar return data.

12. The method of claim 11, further comprising:
   providing a control signal to the weather radar system for controllably steering a radar sweep.

13. The method of claim 12, wherein the radar sweep comprises one or more vertical sweeps and the weather radar data is weather map data.

14. The method of claim 13, wherein the one or more vertical sweeps comprise vertical sweeps that are substantially orthogonal.

15. The method of claim 13, wherein a set of radials for a pair of vertical sweeps is determined by at least one of: the processing electronics calculating acceptable ranges of scan angles to the left and right of or along the aircraft, or the processing electronics searching the terrain database within each acceptable range of scan angles to find a feature that is better for associating with the displayed tile.

16. The method of claim 11, wherein the provided indication is indicative of at least one of: loading an incorrect terrain tile for use by the electronic display, using an incorrect navigation solution for the electronic display, or using an incorrect altitude or heading solution for the electronic display.

17. The method of claim 11, further comprising:
   using the radar return data to determine a navigation solution.

18. The method of claim 11, wherein indication of whether the displayed tile corresponds to the associated radar return data is determined by at least one of:
   matching a terrain profile covered by the radar return data, verifying a location of hill tops, verifying a location of shadows, verifying a location of a horizon line within the radar sweep, or matching segments of a terrain profile covered by the radar return data.

19. The method of claim 18, wherein associating the radar return data with a displayed tile in the perspective image of terrain is based in part on the aircraft's position above, next to, or below surrounding terrain, based in part on expected terrain types, by searching for shadows or hill tops in a vertical sweep, or by looking for a horizon line.

20. A synthetic vision system for an aircraft comprising processing electronics configured to generate a perspective image of terrain by retrieving terrain tiles from a terrain database, wherein the processing electronics are further configured to receive radar return data from a weather radar system and to associate the radar return data with a displayed terrain tile, wherein the processing electronics are also configured to provide an indication of whether the displayed terrain tile corresponds with a physical characteristic of terrain in the associated radar return data, wherein the processing electronics, wherein the processing electronics analyzes weather data to determine radials obscured by weather, and wherein the processing electronics are further configured to adjust a radar scan angle in order to avoid the determined radials.

* * * * *